March 29, 1966 S. HANSEN ETAL 3,243,348
RADIALLY CONVERGING FUSION REACTOR
Original Filed Aug. 19, 1960
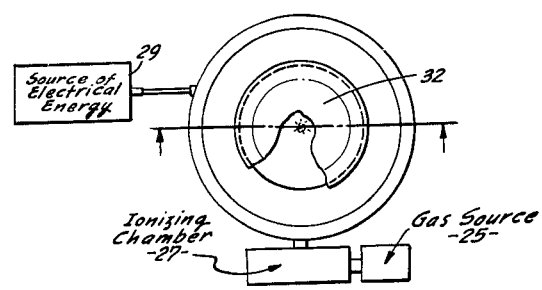
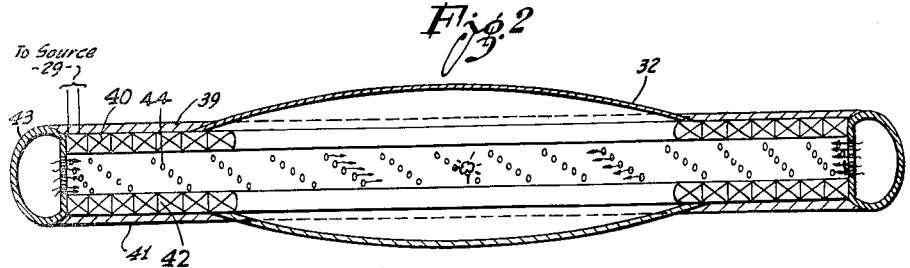

United States Patent Office 3,243,348
Patented Mar. 29, 1966

3,243,348
RADIALLY CONVERGING FUSION REACTOR
Siegfried Hansen and Giusto Fonda Bonardi, Los Angeles, Calif., assignors to Litton Systems, Inc., Beverly Hills, Calif.
Original application Aug. 19, 1960, Ser. No. 50,610, now Patent No. 3,155,592, dated Nov. 3, 1964. Divided and this application May 2, 1963, Ser. No. 278,522
3 Claims. (Cl. 176—1)

This is a division of patent application Serial No. 50,610, filed August 19, 1960, which issued as Patent No. 3,155,592, granted November 3, 1964.

The present invention relates to a nuclear fusion reactor and more particularly to a nuclear fusion reactor using accelerated gaseous plasma masses directed along collision courses whereby the plasma masses collide in a predetermined collision area.

Because of the anticipated exhaustion of fossil fuels (i.e., coal, oil, natural gas), commonly used for power, and because of the limited supply and hazards of use of fissionable fuels, recently much attention has been directed to the problem of developing a nuclear fusion reactor. It is clear that such a reactor could provide a solution to the world's power problems since one of the basic fusion fuels is deuterium or heavy hydrogen which is contained in the oceans in inexhaustible amounts. Furthermore, a fusion reactor would be inherently stable and not subject to explosion. Hence, if fusion reaction can be made to yield useful power, it will solve forever the earth's fuel supply problem.

While it is well known that both the sun and other stars have for billions of years generated vast amounts of energy through thermonuclear fusion reactions, whether such a fusion reaction can be produced on earth to generate useable power is a totally different problem. In referring to the difficulties involved in mechanizing a thermonuclear fusion power plant, Dr. Richard F. Post of the University of California radiation laboratories has stated, "It is undoubtedly the most difficult project ever presented to scientists and engineers."

It was discovered at an early date that a proton could be caused to break through the nuclear electrostatic repulsion forces of a light nucleus to form a heavier nucleus, the fusion process resulting in the release of energy in accordance with the famous Einstein Theory. However, in order to achieve the fusion of one proton, it has been found necessary to accelerate literally thousands of protons since the probability of a proton fusion with a light nucleus is extremely small. Thus, while the energy released by the fusion of a proton is substantially greater than the energy utilized to accelerate that proton, the energy is far less than the total energy utilized to accelerate the fusing proton as well as the thousands of protons which do not undergo fusion. Hence, this method of producing a fusion reaction is of no importance in mechanizing a useful power reactor since the energy necessary to achieve fusion is greater than the energy released by the fusion reaction.

It should be noted that one of the reasons for the small probability of proton fusion is that most of the proton energy is exhausted ionizing target atoms along the path of the proton so that in most cases, the velocity of the proton is reduced below the level necessary for fusion before it has an opportunity to strike one of the target nuclei.

Examining generally what is necessary to obtain a thermonuclear fusion reaction of a useful type, or in other words, one that produces more energy than it uses, it must be realized that the fuel which is to be used in the reaction must be raised to an ignition point or in other words, the nuclei of the fuel must contain sufficient energy so that they will collide with sufficient violence to stick together or fuse. One of the basic problems is that this ignition point is equivalent to hundreds of millions of degrees centigrade. This presents great difficulties. Referring to the ignition point of a specific fuel, for example, deuterium or heavy hydrogen which is a most attractive fuel in that it is contained in ordinary water, it can be theoretically shown that if one starts with a mass of deuterium gas plasma at standard temperature and pressure and raises the temperature of the mass to 100 million degrees some deuterium atoms can be made to fuse thereby releasing energy. It should be noted that at this temperature the pressure of the mass, if held in the same volume, will be 22 million pounds per square inch. However, at this temperature and pressure, the reaction is still not self-sustaining, the reaction becoming self-sustaining at about 350 million degrees centigrade.

Upon considering the foregoing, two facts become evident. One is that if the energy necessary to sustain a fusion reaction is to be introduced into a plasma by means of the random motion of the plasma nuclei, or in other words, by raising the temperature of the plasma, the pressure of the plasma at standard temperature must be on the order of one ten-thousandths of an atmosphere in order that at 350 million degrees the pressure of the gas will be within controllable bounds. It is clear, however, that working with gases at such low pressures involves the solving of numerous difficult problems. Secondly, it is clear that the walls of any container used to contain the plasma cannot be maintained at or near the temperature of the plasma since no material known to man would remain in a liquid or solid state at that temperature. On the other hand, if the walls of the container are not maintained at or near the temperature of the plasma, it is clear that the particle energy of the nuclei of the plasma will be dissipated, thus quenching the reaction, whenever quantities of plasma particles strike the container walls, so that a continuous fusion reaction could not be maintained.

It has occurred to a number of scientists that the problem of confining a very hot gas within a material chamber without allowing any appreciable amount of the gas to reach the chamber walls could be solved by confining the plasma within a magnetic field which would keep the plasma particles away from the container walls. According to the most prominent theory, if a gas plasma fills a donut-shaped tube and a magnetic field is generated which induces a current within the plasma which is directed circumferentially around the tube, the current set up within the plasma will produce a strong toroidal shaped magnetic field in the plasma which pinches or compresses the donut-shaped plasma ring so that it does not contact the walls of the hollow tube container.

Prior art experimentation along the foregoing lines has uncovered a number of serious difficulties in attempting to mechanize a thermonuciear reactor in accordance with the theory. For example, because the plasma must be of such relatively low density, the nuclei of the plasma have a substantially long mean free path between collision and thus it is required that the confinement or pinch period be maintained for as long as ten seconds to produce a thermal fusion reaction. However, it has been found through experimentation that, while a plasma can be pinched or compressed according to the theory, the pinch lasts only a few millionths of a second, the plasma ring then twisting or snaking violently and finally driving itself into the tube wall. Furthermore, it was discovered that the tighter the pinch compression, the faster was the twisting and eventual destruction of the pinch effect. Thus, it has been impossible to maintain a column pinched sufficiently long to obtain a self-sustaining thermonuclear fusion reaction. Hence, the prior art is devoid of a useful fusion reactor capable of producing an energy output in excess of the energy input.

The present invention overcomes the foregoing and other numerous prior art problems involved in the mechanism of a power fusion reactor by utilizing an electrically neutral, unconfined, high density gas plasma at relatively low temperatures to produce output energy from fusion between plasma particles which is substantially in excess of the input energy. In accordance with the concepts of the present invention, a high translational velocity is imparted to a plasma mass by an accelerating apparatus, the plasma thereby obtaining sufficient energy for fusion rather than by imparting random thermal motion to the plasma particles as in the attempted prior art thermonuclear reactors. More particularly, since the reactor of the invention is not thermonuclear, the uncontrollable pressures encountered with high temperature thermal motion are avoided. Therefore, a relatively small inward directed velocity imparted to the plasma by the accelerating apparatus is sufficient to converge the plasma after leaving the accelerating apparatus to a small mass having a high frontal area density without the application of any external forces.

In one embodiment of the present invention, a circular-shaped accelerator is utilized for accelerating an annularly-shaped ionized gas or plasma mass positioned within the accelerator and concentric therewith in such a manner that the annular-shaped mass collapses or converges toward its own center. More particularly, the accelerator includes a pair of annular plates having a circular manifold positioned between and adjacent the peripheries of the plates for introducing ionized gas peripherally between the annular plates. The plasma positioned between the plates is then directed uniformly toward the center of the accelerator with a substantial velocity by accelerator operation whereby oppositely placed particles of the annular plasma collide at the center of the accelerator with sufficient relative velocities to fuse.

It is, therefore, an object of the present invention to provide a fusion power reactor.

It is another object of the present invention to supply to a pair of plasma nuclei sufficient energy to fuse through relative translation motion of one nucleus relative to the other rather than through random thermal motion produced by high temperatures.

It is a further object of the present invention to fuse relatively cold plasma particles.

It is still another further object of the present invention to provide a nuclear fusion reactor wherein deuterium nuclei collide with tritium nuclei to form helium and fast neutrons.

It is a different further object of the invention to provide a fusion reactor wherein deuterium nuclei collide with each other to form helium nuclei and tritium nuclei.

The novel features which are believed to be characteristic of the invention both as to its organization and method of operation, together with further objects and advantages thereof, will be better understood from the following description considered in connection with the accompanying drawings, in which several embodiments of the invention are illustrated by way of example. It is to be expressly understood, however, that the drawings are for the purpose of illustration and description only, and are not intended as a definition of the limits of the invention.

FIGURES 1 and 2 are top and sectionalized side views of one embodiment of the invention.

Referring now to the drawings wherein like or corresponding parts are designated by the same reference characters throughout the several views there is shown in FIGURES 1 and 2, a circular accelerating structure of the invention including a pair of annular plates 39 and 41 forming top and bottom sections, respectively, of the structure and a circular manifold 43 positioned between and adjacent the periphery of the plate. As is shown in FIGURE 1, manifold 43 is connected to a gas source 25 through an ionizing chamber 27. The manifold is operable for introducing the ionized gas or plasma from source 25 peripherally between the annular plates by means of a plurality of apertures 44, shown in FIGURE 2. In addition, as is shown in FIGURES 1 and 2, there is wound upon annular plate 39 a plurality of concentric annular coils 40 while there is wound upon plate 41 a similar plurality of annular windings 42 in registry with the windings on plate 39.

Considering the overall operation of the fusion reactor, a gaseous mixture of deuterium and tritium in substantially equal amounts from gas source 25 are applied through ionizing chamber 27 to the accelerating chamber formed by plates 39 and 41 and circular manifold 43. More particularly, the gas is directed through manifold 43 into the chamber through the apertures shown in FIGURE 2.

In operation, electrical energizing signals from a signal source 29 are sequentially applied simultaneously to the windings 40 and 42 in registry, commencing with the coils furthest from the center and ending with the coils nearest the center whereby an extremely strong magnetic field is first generated around the field coil winding adjacent to the input of the accelerating structure and then around each of the remaining field windings in sequence in accordance with a predetermined accelerating schedule. Hence, a magnetic field is generated which accelerates through the accelerating structure to uniformly accelerate the plasma in the chamber toward the center of the accelerating structure, the plasma in the chamber being conformed to an annular plasma ring by the application of the signals to windings 40 and 42. Considering now the effects of the accelerating magnetic field upon the plasma mass in the accelerating structure, it should be noted that since the plasma has a high conductivity it has a circulating electric current induced therein in response to the magnetic field, which will, in turn, react with the movement of the accelerating magnetic field in substantially the same manner as does the rotor of an induction motor by following after the advancing field. Inasmuch as the magnetic field is accelerating rather than moving at a constant velocity, the plasma is accelerated as it advances in the accelerating structure, the velocity of the plasma slipping or falling behind slightly with respect to the field velocity to thus induce a current within the plasma and thereby maintaining the ionization of the plasma. It is clear that as all portions of the ring are accelerated toward the center of the accelerating structure, the radius of the plasma ring becomes smaller and smaller so that the plasma ring converges to a body having an extremely small frontal area at the center point. Furthermore, it is clear that oppositely disposed particles within the plasma will be accelerated toward each other with oppositely directed velocities and will collide with one another at or near the center with relative velocities equal to twice their actual velocities.

As is described in detail in the previously referenced patent application a shield, heat exchanger, and power generator can be utilized with the reactor of the invention for converting the energy released by the fusion reactions to electrical energy which is easily transported and utilized by conventional electrical and engineering techniques. In the embodiment herein described wherein a gaseous mixture of deuterium and tritium in substanitally equal amounts is utilized approximately 80% of the energy released by the fusion process is possessed by the escaping neutrons so that the energy converted by the converting apparatus is many times the input energy.

It should be clear from the foregoing discussion that other alternative embodiments of the invention may be devised without departing from the basic concepts of the invention as herein set forth. For example, numerous fusion fuels can be used with the reactor of the invention instead of the deuterium-tritium gases herein mentioned. More particularly, the nuclei of a deuterium gas plasma can be fused with the nuclei of another deuterium gas plasma to form tritium nuclei of helium 3 nuclei and neutrons.

Accordingly, it is to be expressly understood that the spirit and scope of the invention is to be limited only by the scope of the appended claims.

What is claimed as new is:

1. nuclear fusion reactor for generating energy, said reactor comprising:
   a circular-shaped plasma accelerator having a plasma input area and input means for providing a plasma at said input area, said accelerator including at least one plurality of annular shaped, nested and concentrically positioned accelerating coils responsive to the application of a plurality of predetermined electrical signals for conforming said plasma to an annular shape substantially concentric with said circular accelerator and for accelerating said annular-shaped plasma toward the center of said circular accelerator and for converging said annular-shaped plasma at the center to an extremely small body wherein oppositely disposed particles contact each other with sufficient velocity to fuse; and
   a source of the predetermined electrical signals coupled to said accelerating coils.

2. A nuclear fusion reactor comprising: a chamber; means for placing a plasma into said chamber; and means for conforming said plasma to a toroid, said means including at least one plurality of nested annular coils and means for applying electric signals sequentially to said coils for imparting a radially inward force to said plasma along the plane of said toroid and for converging oppositely disposed particles therein at a preselected point in said chamber with sufficient velocity to fuse.

3. A nuclear fusion reactor comprising: a chamber; means for generating a magnetic field in said chamber, said means including two substantially parallel sets of nested annular coils for accelerating said magnetic field towards a preselected point in said chamber; and means for placing a plasma in said chamber between said sets of coils, said plasma having a circulating electric current induced therein by said magnetic field and having an inwardly accelerating force applied thereby for converging said plasma at said preselected point with sufficient velocity to fuse.

References Cited by the Examiner

UNITED STATES PATENTS 2,992,345    7/1961    Hansen    176—2 X
3,113,917    12/1963    Linhart    176—1

FOREIGN PATENTS 205,612    10/1959    Austria.
876,279    5/1953    Germany.
637,866    5/1958    Great Britain.

REUBEN EPSTEIN, *Primary Examiner.*

CARL D. QUARFORTH, *Examiner.*